Figure 6:
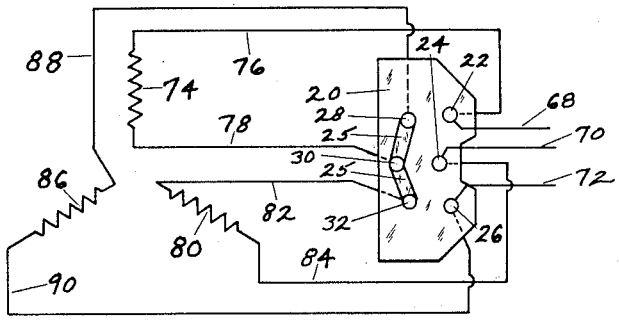

Feb. 27, 1951     R. V. SEIFRIED     2,543,131
DYNAMOELECTRIC MACHINE
Filed March 18, 1947     3 Sheets-Sheet 1
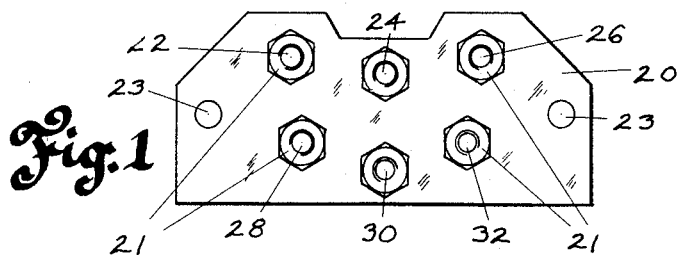
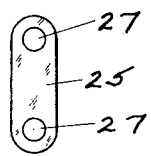
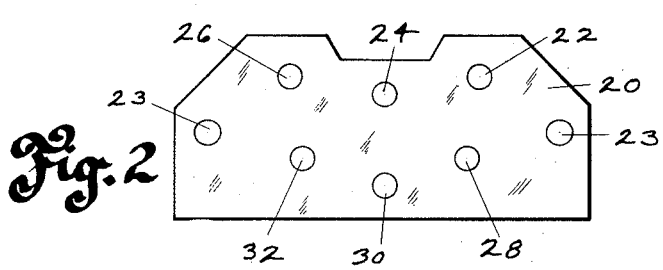
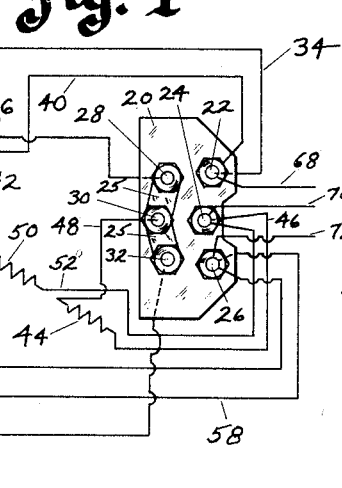
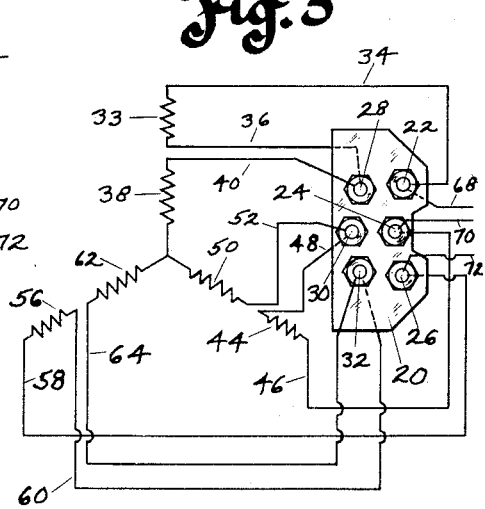
INVENTOR
REINHOLD V. SEIFRIED
BY
Roy M. Eilers
ATTORNEY Feb. 27, 1951 R. V. SEIFRIED 2,543,131
DYNAMOELECTRIC MACHINE
Filed March 18, 1947 3 Sheets-Sheet 2

INVENTOR
REINHOLD V. SEIFRIED
BY
Roy M. Eilers
ATTORNEY

INVENTOR
REINHOLD V. SEIFRIED
BY
Roy M. Eilers
ATTORNEY

Patented Feb. 27, 1951

2,543,131

UNITED STATES PATENT OFFICE 2,543,131

DYNAMOELECTRIC MACHINE

Reinhold V. Seifried, Clayton, Mo., assignor to Century Electric Company, St. Louis, Mo., a corporation of Missouri Application March 18, 1947, Serial No. 735,489

4 Claims. (Cl. 318—245)

This invention relates to improvements in dynamo electric machines. More particularly, this invention relates to improvements in dynamo electric machines which are equipped with terminal blocks and wiring arrangements that facilitate ready changing of the leads of the machines and a concomitant changing of the operating characteristics of the machines.

It is, therefore, an object of the present invention to provide a dynamo electric machine with an improved terminal block and wiring arrangement that facilitates ready changing of the leads of the machine.

In the commercial production of dynamo electric machines it is desirable to standardize the form and construction of the various elements of the machines as completely as possible, because such standardization materially decreases the cost of making the machines by decreasing the number of patterns, cores, jigs and tools required in the manufacture of the machines. This standardization is further desirable because it reduces the inventory of parts that must be kept on hand by the manufacturer and it also reduces the stock of parts that must be kept on hand by service men and repair men. Accordingly, it has become the practice, wherever possible, to make dynamo electric machines, such as electric motors, with a plurality of leads that are connectible together in various combinations to make the one machine operable at two different speeds or on two different voltages. Where this is done, a number of the machines of the one type can be manufactured and stored and can then be selectively connected to fill orders for high and low speed machines or high and low voltage machines. It has become the usual practice with such dynamo electric machines to provide the windings with relatively long, flexible leads that can be made to extend into a junction box or terminal box carried by the housing of the dynamo electric machine; and those leads are then selectively connected together in the proper manner, at the time shipment is made, to provide the desired operating characteristics for the machines.

When these dynamo electric machines come from the production line, their stators and rotors are installed in the housings, and the leads of the windings are positioned in the junction boxes or terminal boxes. The machines can be kept in this condition until orders are received for them; and thereafter, in compliance with those orders, the leads of the windings can be connected together in such a way that the machines will operate at the desired speed or voltage. In some instances, dynamo electric machines of this type that can operate at different speeds or at different voltages have as many as four to six separate windings; and each of the windings will have two leads. The presence of this large number of leads causes severe crowding in the junction boxes and terminal boxes of the dynamo electric machines. Where the machines are large, as in the case of integral horsepower dynamo electric machines, the crowding is not hopeless because the junction boxes and terminal boxes of those machines are large enough to permit soldering and taping of the leads; but where the machines are fractional horsepower machines the crowding in the junction boxes and terminal boxes is excessive. In many instances, manufacturers have refused, or been unable, to make multi-speed or multi-voltage fractional horsepower dynamo electric machines because of the difficulty of soldering the many leads from the windings and then forcing them into the junction boxes and insulating them from the junction boxes and from each other. It would, of course, be possible to provide oversize junction boxes or terminal boxes for the fractional horsepower machines, but such boxes would increase the cost of the machines and would also make the machines unwieldy and of unduly large size. The present invention obviates these difficulties by providing a terminal block with terminals that receive the line conductors and the leads from the windings and permits them to be secured together in any suitable combinations. With such a construction, one or more of the leads from the windings can be cut to the desired length and can be permanently attached to the terminals of the block, thus eliminating any excess lengths of wire and also eliminating the need for excess room to receive twisted, soldered and taped wires. In addition, this construction makes it possible to cut the rest of the leads and the line conductors to a length that permits them to be connected to one or the other of the spaced terminals of the block; again eliminating excess lengths of wire and the need for excess room to receive twisted, soldered and taped wires. It is, therefore, an object of the present invention to provide a terminal block with terminals to which a number of the leads from the winding can be permanently secured, and to which the line conductors and the rest of the leads can be removably secured.

In utilizing the terminal block of the present invention, the leads that are permanently secured to the block can be secured to the portions of the terminals that are exposed at one side of the block, and the removably secured leads can be secured to the portions of the terminals that are exposed at the other side of the block. With this construction, the permanently secured leads cannot interfere with the removably secured leads, and the removably secured leads are freely accessible and can be selectively connected to the terminal block as desired. It is, therefore, an object of the present invention to permanently secure certain of the leads of the windings of the dynamo electric machine to the portions of the terminals which are exposed at one side of the terminal block, and then to removably secure the line conductors and other of the leads to the portions of the terminals which are exposed at the other side of the terminal block.

In some instances, a portion of the leads from the windings can be permanently secured to the terminals of the block, while the rest of the leads can be removably secured to those terminals and can be changed about to effect desired changes in the operating characteristics of the dynamo electric machine. In other instances the various leads can all be permanently secured to the terminal block, and changes in the operating characteristics of the machine can be effected by use of connector links that are selectively attachable to the terminals of the terminal block. In still other instances, the removably secured leads must be moved from a first set of terminals to a second set of terminals and a connector link must be secured to one or more sets of the terminals of the terminal block. Moreover, it is also possible to secure all of the leads from the windings of the dynamo electric machine to the portions of the terminals which are exposed at one side of the block and to selectively connect the line conductors to various of the terminals at the other side of the block, thus obtaining the desired change in the operating characteristics of the machine. From this it is apparent that by use of the terminal block and connecting links of the present invention, it is possible to obtain almost any desirable wiring arrangement for multi-speed or multi-voltage dynamo electric machines. It is, therefore, an object of the present invention to provide a terminal block for dynamo electric machines and to provide connecting links that can be used with that terminal block.

The terminal block of the present invention has six separate terminals, and those terminals are set in two rows which are spaced apart a distance equal to the spacing between the terminals in each row. With such a construction, connecting links that are usable with the terminal block can be dimensioned so they can connect together the adjacent terminals in either row or can connect together those terminals of the two rows that are opposite to and in register with each other. Such a spacing and dimensioning of the terminals of the terminal block makes it possible to provide one size of connecting link that can be used to provide the required selective connection of the terminals. It is, therefore, an object of the present invention to provide a terminal block wherein the terminals are spaced in rows and wherein the spacing of the rows corresponds to the spacing between the terminals in the rows.

Other and further objects and advantages of the present invention should become apparent from an examination of the drawing and accompanying description.

In the drawing and accompanying description, a preferred embodiment of the invention is shown and described but it is to be understood that the drawing and accompanying description are for the purposes of illustration only and do not limit the invention and that the invention will be defined by the appended claims.

Figure 7:
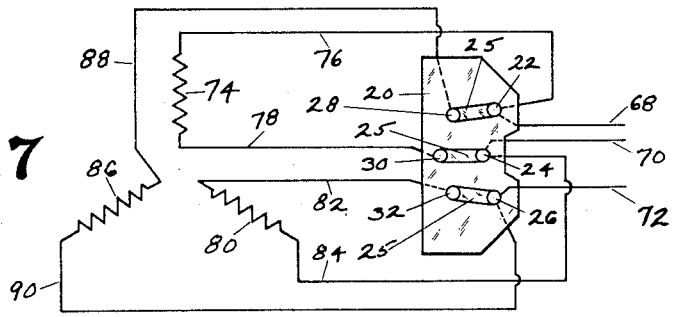
Figure 8:
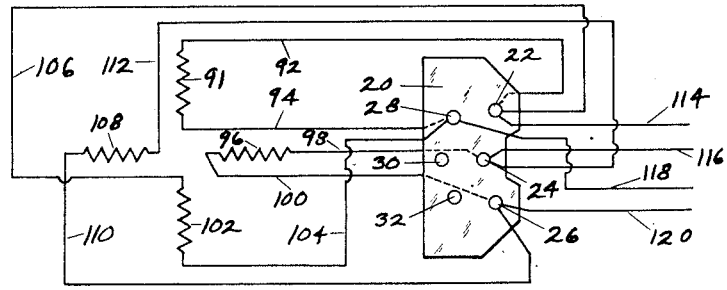
Figure 9:
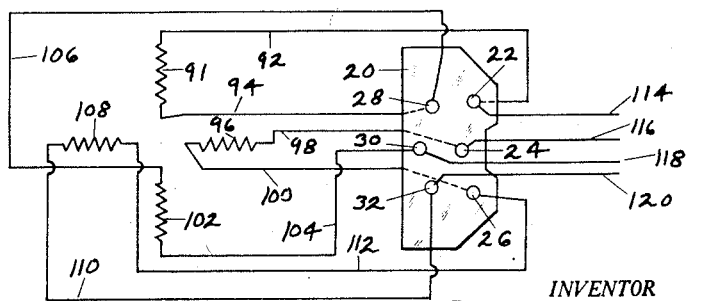
Figure 10:
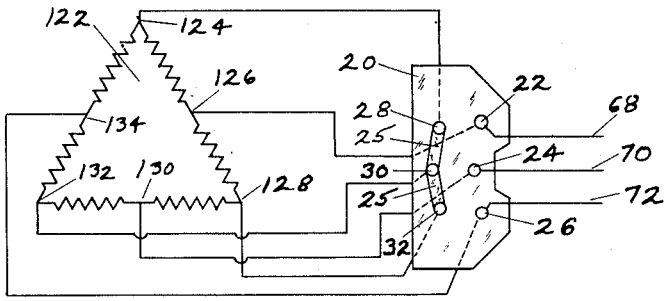

In the drawing,

Fig. 1 is a front elevational view of a terminal block embodying the principles and teachings of the present invention, Fig. 2 is a rear elevational view of the terminal block shown in Fig. 1, Fig. 3 is a front elevational view of a connector link usable with the terminal block of Figs. 1 and 2, Fig. 4 is a schematic diagram of a circuit which connects the six windings of a three phase, multi-voltage motor to the terminal block of the present invention to provide low voltage operation, Fig. 5 is a schematic diagram of a circuit which connects the six windings of the three-phase, multi-voltage motor of Fig. 4 with the terminal block of the present invention to provide high voltage operation, Fig. 6 is a schematic diagram of a circuit that connects the three windings of a three-phase motor as a star hook-up, Fig. 7 is a schematic diagram of a circuit which connects the three windings of the motor of Fig. 6 as a delta hook-up, Fig. 8 is a schematic diagram of a circuit which connects a two-phase, two-voltage motor to the terminal block of the present invention for low voltage operation, Fig. 9 is a schematic diagram of a circuit which connects the two-phase, two-voltage motor of Fig. 8 to the terminal block of the present invention for high voltage operation, Fig. 10 is a schematic diagram of a circuit which connects the single winding of a three-phase, two-speed, constant horsepower motor to the terminal block of the present invention to provide low speed operation.

Figure 11:
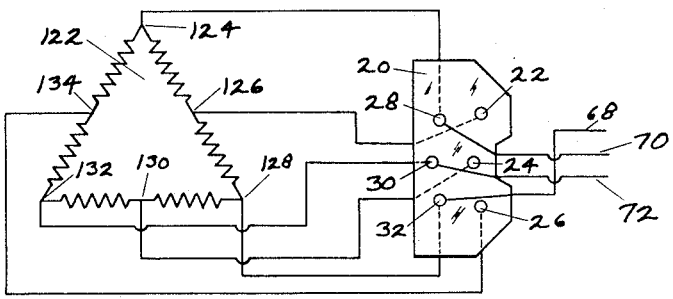
Figure 12:
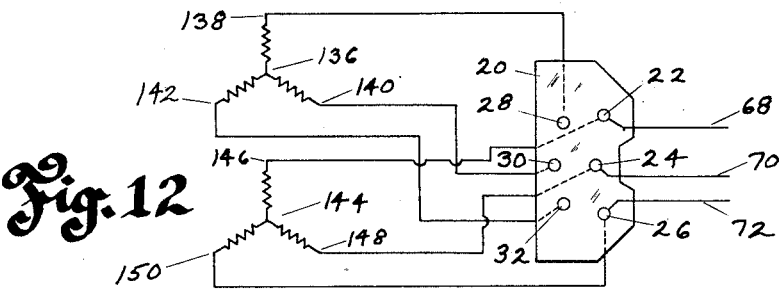
Figure 13:
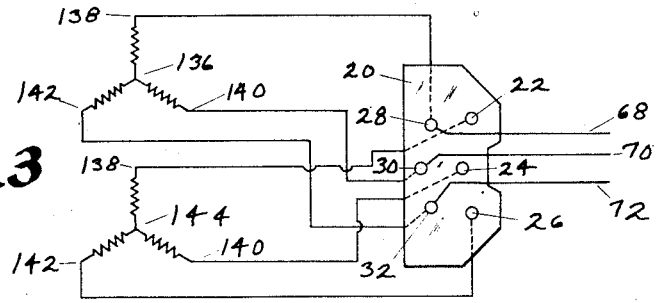

Fig. 11 is a schematic diagram of a circuit which connects the single winding of the motor of Fig. 10 to the terminal block of the present invention for high speed operation, Fig. 12 is a schematic diagram of a circuit which connects the two windings of a three-phase, two-speed motor to the terminal block of the present invention for low speed operation, and Fig. 13 is a schematic diagram of a circuit which connects the windings of the motor of Fig. 12 to the terminal block of the present invention for high speed operation.

Referring to the drawing in detail the numeral 20 refers to a block of insulating material; and this block 20 has secured to it, and exposed at the opposite sides thereof, six terminals 22, 24, 26, 28, 30 and 32. The front portions of each of the terminals 22, 24, 26, 28, 30 and 32 may project from the front of the block 20 and may be threaded to receive nuts 21; and these nuts will be adapted to secure the line conductors and the leads of the windings of a motor to the terminals 22, 24, 26, 28, 30 and 32. The terminal block 20 is also provided with spaced openings 23 at the opposite ends thereof to permit securement of the terminal block 20 to the housing of a dynamo electric machine or to a terminal box or junction box for a dynamo electric machine. The numeral 25 denotes a connector link that is provided with spaced openings 27 therein; and the openings 27 are spaced in such a way that the center-to-center distance of the openings 27 is equal to the center-to-center distance of the following combinations of terminals: 22—28, 28—30, 30—24, 30—32, and 32—26. With such a construction, the links 25 can be suitably placed in engagement with the terminals of the terminal block 20 to connect together the recited combinations of terminals, and thus effect the desired wiring arrangement for the dynamo electric machine with which the block 20 is used.

Referring to Fig. 4 the numerals 33, 38, 44, 50, 56 and 62 denote the six windings of the stator of a three-phase, multi-voltage motor. One end of the winding 33 is permanently connected to the rear surface of the terminal 22 as by soldering or brazing the lead 34 to the terminal 22, and the other end of the winding 33 is permanently connected to the rear surface of the terminal 28 as by soldering or brazing the lead 36 to the terminal 28. One end of the winding 38 is removably secured to the front surface of the terminal 22 by the lead 40, and the other end of the winding 38 is permanently connected to one end of each of the windings 50 and 62 by the leads 42, 54 and 66. One end of the winding 44 is permanently secured to the rear surface of the terminal 24 by means of the lead 46, and the other end of the winding 44 is permanently secured to the rear surface of the terminal 30 by the lead 48. One end of the winding 50 is removably secured to the front surface of the terminal 24 by the lead 52, and the other end of the winding 50 is permanently secured to each of the windings 38 and 62 by the leads 54, 42 and 66. One end of the winding 56 is permanently secured to the rear surface of the terminal 26 by lead 58, and the other end of the winding 56 is permanently secured to the rear surface of the terminal 32 by the lead 60. One end of the winding 62 is removably secured to the front surface of the terminal 26 by the lead 64 and the other end of the winding 62 is permanently secured to each of the windings 38 and 50 by the leads 66, 42 and 54. Removably secured to the front surface of the terminal 22 is the line-conductor 68, removably secured to the front surface of the terminal 24 is the line-conductor 70, and removably secured to the front of the terminal 26 is the line conductor 72. With the wiring arrangement shown in Fig. 4, the terminals 28 and 30 are bridged by a connector link 25, and the terminals 30 and 32 are bridged by another connecting link 25; and such a hook-up provides low voltage operation for the motor with the six windings 33, 38, 44, 50, 56 and 62.

The motor that is shown schematically in Fig. 4 is also shown schematically in Fig. 5; but in Fig. 5 the windings 33, 38, 44, 50, 56 and 62 are connected to the terminal block 20 in such a way as to provide high voltage operation of the motor. In this circuit diagram the leads 34, 36, 46, 48, 58 and 60 of the windings 33, 44, and 56, all of which are attached to the portions of the terminals that are exposed at the rear of the terminal block 20, remain unchanged; but the connecting links 25 have been removed from the terminals 28, 30 and 32, and the positions of the leads 40, 52 and 64 have been changed. Lead 40 has been shifted from terminal 22 to terminal 28, lead 52 has been shifted from terminal 24 to terminal 30, and lead 64 has been shifted from terminal 26 to terminal 32. Once again the line conductors 68, 70 and 72 are respectively connected to terminals 22, 24 and 26. With such a circuit arrangement, the motor with the windings 33, 38, 44, 50, 56 and 62 will operate at high voltage. It will be noted that with this construction, all that was required was the removal of the two connecting links 25 and the shifting of the leads 40, 52 and 64 to change the operation of the motor from low voltage to high voltage; no change whatsoever was required in the position of the leads of windings 33, 44 and 56, or in the position of the line conductors 68, 70 and 72. Consequently, it is possible to permanently secure the leads of windings 33, 44 and 56 to the back of the terminal block 20 and to dimension those leads so they have just the desired length and do not have any excess length that would interfere with the connection and removal of the other leads to the front of the terminal block 20. Moreover, by having the leads of windings 33, 34 and 56 attached to the rear of the terminal block 20, the present invention leaves the entire area adjacent the front of terminal block 20 available for selective connection of the other leads to the front portions of the terminals of that block.

From this it should be apparent how easy it is to manufacture a number of three phase, two voltage motors of the exact same size, type and form, and to connect some of those motors for high voltage operation and to connect the rest of those motors for low voltage operation. Thus, in effect, it is possible to use one set of dies, jigs and tools to make two different motors. This makes possible a great saving in the cost of manufacture of the motors.

Referring to Fig. 6, the terminals of the block 20 are not shown as being provided with nuts 21; but this was done to facilitate a clearer showing of the arrangement of the leads of the windings, and it will be understood that in using the construction shown in this and all subsequent figures, nuts or other means will be used to secure the leads to the terminals. In Fig. 6, the three windings of the stator of a three-phase motor are denoted by the numerals 74, 80 and 86; and one end of the winding 74 is permanently connected to the rear of the terminal 22 by the lead 76, and the other end of the winding 74 is permanently connected to the rear of the terminal 22 by the lead 76, and the other end of the winding 74 is permanently connected to the rear of the terminal 30 by the lead 78. One end of the winding 80 is permanently connected to the rear of the terminal 32 by the lead 82, and the other end of the winding 80 is permanently connected to the terminal 24 by the lead 84. One end of the winding 86 is permanently connected to the rear of the terminal 28 by the lead 88, and the other end of the winding 86 is permanently connected to the rear of the terminal 26 by the lead 90. Bridged across terminals 28 and 30 is a connector link 25, and bridged across terminals 30 and 32 is a second connector link 25. Secured to the terminals 22, 24, and 26, respectively, are the three line conductors 68, 70 and 72 of a three-phase line. With this circuit diagram, the windings 74, 80 and 86 are connected together as a star hook-up.

In Fig. 7, the windings 74, 80 and 86 of the motor of Fig. 6 are connected together as a delta hook-up; and all that need be done to effect the change from the star hook-up to the delta hook-up is to change the positions of the connector links 25. One of the links 25 can be used to bridge terminals 28 and 22, a second connector link 25 can be used to bridge the terminals 32 and 26, and a third connector link 25 can be used to bridge the terminals 30 and 24. At such time, each of the leads 76, 78, 82, 84, 88 and 90, and each of the line connectors 68, 70 and 72 will occupy the same position they occupied in Fig. 6; but because of the change of the position of the two connector links 25 and the addition of the third connector link 25, the motor will have different operating characteristics. Once again it becomes apparent that it is possible by use of the terminal block of the present invention to permanently secure a portion of the leads, and in this instance it happens to be all of the leads of the motor windings, to the back of the terminal block and thus eliminate excess wiring while facilitating prompt and ready changing of the operating characteristics of the motor. Moreover, it becomes apparent how greatly the terminal block 20 of the present invention facilitates changes in the operating characteristics of the motor, since all that need be done is to change the position of the connector links 25.

Referring to Fig. 8, the four windings of a two-phase, two-voltage motor are shown; and those windings are denoted by the numerals 91, 96, 102 and 108. One end of the winding 91 is permanently connected to the rear of terminal 22 by lead 92, and the other end of the winding 91 is permanently connected to the rear of the terminal 28 by the conductor 94. One end of the winding 96 is permanently connected to the rear of the terminal 24 by the lead 98, and the other end of the winding 96 is permanently connected to the rear of the terminal 26 by the lead 100. One end of the winding 102 is removably secured to the terminal 22 by the lead 106, and the other end of the winding 102 is removably secured to the terminal 28 by the lead 104. One end of the winding 108 is removably secured to the front of the terminal 26 by the lead 110, and the other end of the winding 108 is removably secured to the front of the terminal 24 by the lead 112. Line conductor 114 is removably secured to the front part of terminal 22, line conductor 116 is removably secured to the front part of the terminal 24, line conductor 118 is removably secured to the front part of terminal 28, and line conductor 120 is removably secured to the front part of the terminal 26. With such a circuit arrangement, the motor will operate at low voltage.

To change the motor of Fig. 8 from low voltage operation to high voltage operation, as shown in Fig. 9, all that need be done is to shift line conductor 118 from the front of terminal 28 to the front of terminal 30, shift line conductor 120 from the front of terminal 26 to the front of terminal 32, to shift lead 106 from the front of terminal 22 to the front of terminal 28, to shift lead 104 from the front of terminal 28 to the front of terminal 30, to shift lead 110 from the front of terminal 26 to the front of terminal 32, and to shift lead 112 from the front of terminal 24 to the front of terminal 26. Here again it becomes quite obvious that with the terminal block of the present invention, it is possible to secure most of the leads to the back of the terminal block, thus facilitating precise dimensioning of these leads, and also permitting free access of other leads to the front of the terminal block. Moreover, it again becomes obvious how easily the motor can be given the desired operating characteristics.

In Fig. 10, the single winding of a three-phase motor is denoted by the numeral 122, and that winding has a number of taps 124, 126, 128, 130, 132 and 134. The tap 124 is permanently secured to the rear of the terminal 28, the tap 126 is permanently secured to the rear of the terminal 22, the tap 128 is permanently secured to the rear of the terminal 32, the tap 130 is permanently secured to the rear of the terminal 24, the tap 132 is permanently secured to the rear of the terminal 30, and the tap 134 is permanently secured to the rear of the terminal 26. The line conductors of a three-phase line, 68, 70 and 72 are respectively connected to the front portions of the terminals 22, 24 and 26; and connector links 25 are used to bridge the conductors 28 and 30, and 30 and 32. With such a circuit, the motor will operate at low speed.

To change the motor of Fig. 10 from low speed to high speed operation, as shown in Fig. 9, all that need be done is to remove the connector links 25 from the terminals 28, 30 and 32, and to shift the line conductors 68, 70 and 72 from terminals 22, 24 and 26 to terminals 32, 28 and 30 respectively. Thus it is possible to change the operating characteristics of the motor so that it will operate at high speed rather than low speed merely by shifting the three line conductors 68, 70 and 72 and by removing the connector links 25.

Referring to Fig. 12, the two windings of a three-phase, two-speed, two-winding motor are shown attached to the terminal block 20 of the present invention. The high speed winding 136 has the three termini 138, 140 and 142 thereof connected respectively to the rear surfaces of terminals 28, 30 and 32. The low speed winding 144 has its termini 146, 148 and 150 connected respectively to the rear portions of the terminals 22, 24 and 26. Where the line conductors 68, 70 and 72 of the three-phase line are respectively connected to the terminals 22, 24 and 26, as they are in Fig. 12, the motor will operate at low speed.

All that need be done to change the motor from a low speed motor to a high speed motor, as shown in Fig. 13, is to remove the line conductors 68, 70 and 72 from the terminals 22, 24 and 26 and connect those line conductors respectively to the terminals 28, 30 and 32. In this circuit, just as in the other circuits shown in the drawing, it is possible to dimension most of the leads from the motor with considerable precision and to avoid excess wiring in the terminal box or junction box. Furthermore, it is possible to eliminate the twisting together of the leads, the soldering of the leads to each other and the taping of the leads; all of which requires room and all of which tends to crowd the terminal box or junction box to the point where the boxes must either be oversized or the amount of insulation reduced, with consequent increase in danger of short circuiting. Moreover, in this circuit as in the other circuits shown in the drawing, the change in the operating characteristics of the motor is easily performed with a minimum of manipulation and with considerable ease because the front of the terminal block is unobstructed by leads which are not to be moved.

In the description relating to the wiring arrangements shown in the drawing, mention is made of changing the operating characteristics of the motors, and such changes can easily be made. In many instances, however, the leads connected to the terminal block 20 will not be changed after the motor has been installed; but in those instances also the terminal block will be of great value. As the motor nears completion, certain of the leads can be permanently connected to the terminals of the block 20 while the rest of the leads can be left unconnected. Upon receipt of orders for the motors, the rest of the leads can be connected quickly and the motors shipped. Having some of the leads permanently connected to the terminal block 20 reduces the amount of work involved in connecting the rest of the leads at the time shipment is made.

Whereas a preferred embodiment of the present invention has been shown and described in the drawing and accompanying description, it is obvious to those skilled in the art that various changes can be made in the form of the invention without affecting the scope thereof.

What I claim is:

1. The combination of a multi-phase, multi-voltage dynamo electric machine and a terminal block therefor which comprises a terminal block, a plurality of terminals on said terminal block, two groups of windings for said dynamo electric machine, said windings having more leads to be connected to said terminal block than said terminal block has terminals, the leads of one of said group of windings being permanently connected to terminals on said terminal block, the leads of the other of said group of windings being releasably secured to terminals on said terminal block, said leads of said other group of windings being selectively connected to the terminals to which the corresponding leads of said one group of windings are connected to place said groups of windings in parallel relation for low voltage operation or being selectively connected to other terminals so said groups of windings are in series relation for high voltage operation, said terminals also receiving the leads of the power line.

2. The combination of a three phase, multi-voltage, dynamo electric machine and a terminal block therefor which comprises a terminal block, six terminals on said terminal block, two groups of windings for said dynamo electric machine, said windings having more than six leads to be connected to said terminal block, the leads of one of said groups of windings being permanently connected to terminals on said terminal block, the leads of the other of said groups of windings being releasably secured to terminals on said terminal block, said leads of said other group of windings being selectively connected to the terminals to which the corresponding leads of said one group of windings are connected to place said groups of windings in parallel relation for low voltage operation or being selectively connected to other terminals so said groups of windings are in series relation for high voltage operation, said terminals also receiving the leads of the power line.

3. The combination of a three phase, multi-voltage dynamo electric machine and a terminal block therefor which comprises a terminal block, six terminals on said terminal block, three windings which have their inner leads connected together to form a star and have their outer leads releasably connectible to the terminals of said terminal block, and three windings which have their leads permanently connected to the terminals of said terminal block, and connectors which releasably connect terminals of said terminal block together, the outer ends of said first group of three windings being selectively connected to the same terminals to which the outer ends of the second group of three windings are connected and said connecting elements being selectively connected to the terminals to which the inner ends of said second group of three windings are connected, whereby said two groups of windings constitute parallel connected star windings for low voltage operations, said connecting element being removable from the terminals of said terminal block and the outer ends of the windings of the first group of windings being connectible to the terminals which receive the inner ends of the windings in the second group of three windings whereby said two groups of windings constitute a star winding with two sections in each leg.

4. The combination of a two phase, multi-voltage dynamo electric machine and a terminal block therefor which comprises a terminal block, six terminals on said terminal block, four windings for said dynamo electric machine which have eight leads connectible to the terminals on said terminal block, the leads of two of said windings being permanently connected to terminals on said terminal block, the leads of the other two windings being selectively connected to terminals on said terminal block to place said second two windings in parallel with said first two windings for low voltage operation or to place said second two windings in series relation with said first two windings for high voltage operation.

REINHOLD V. SEIFRIED.

REFERENCES CITED

The following references are of record in the file of this patent:

UNITED STATES PATENTS

| Number | Name | Date |
|---|---|---|
| 1,680,940 | Emmons | Aug. 14, 1928 |
| 1,902,954 | Hochfeld | Mar. 28, 1933 |

FOREIGN PATENTS

| Number | Country | Date |
|---|---|---|
| 325,121 | Great Britain | Feb. 13, 1930 |
| 344,845 | Great Britain | Mar. 5, 1931 |